United States Patent [19]

Skingley et al.

[11] 3,794,926

[45] Feb. 26, 1974

[54] DIVERSITY COMBINING ARRANGEMENTS

[75] Inventors: Brian Stanley Skingley; Anthony Thomas Curtis, both of Essex, England

[73] Assignee: The Marconi Company Limited, Chelmsford, Essex, England

[22] Filed: Nov. 6, 1972

[21] Appl. No.: 303,868

[30] Foreign Application Priority Data

Dec. 3, 1971 Great Britain .................... 56127/71

[52] U.S. Cl. ................. 328/104, 325/303, 328/154, 328/163, 307/243

[51] Int. Cl. .......................................... H03k 17/02

[58] Field of Search ... 328/103, 104, 152, 154, 163; 325/302–305; 307/243

[56] References Cited

UNITED STATES PATENTS

| | | | |
|---|---|---|---|
| 2,572,912 | 10/1951 | Bucher | 325/302 |
| 2,290,992 | 7/1942 | Peterson | 325/303 |
| 2,600,919 | 6/1952 | Pritchard | 328/154 X |

*Primary Examiner*—John Zazworsky

*Attorney, Agent, or Firm*—Baldwin, Wight & Brown

[57] ABSTRACT

A diversity combining arrangement for combining signals on at least two paths, each path comprising, a muting circuit and means for detecting a pilot frequency signal on the path, control means being provided, responsive to a loss of pilot frequency on the path for rendering the associated muted circuit operative, the control means for each path being interdependent such that upon a loss of pilot frequency on more than one path all of the control means are inhibited from rendering the muting circuits operative.

5 Claims, 2 Drawing Figures

DIVERSITY COMBINING ARRANGEMENTS

This invention relates to diversity combining arrangements and seeks to provide improved such arrangement. According to this invention a diversity combining arrangement for combining signals appearing on at least two paths comprises, for each path, a muting circuit and means for detecting a pilot frequency signal on said path, control means being provided, responsive to a loss of pilot frequency on said path for rendering the muting circuit associated with said path operative, the control means for each path being interdependent whereby upon a loss of pilot frequency on more than one path all of said control means are inhibited from rendering said muting circuits operative.

According to a feature of this invention a diversity combining arrangement for combining signals appearing on at least two paths comprises, for each path, a muting circuit and means for detecting a pilot frequency signal on said path, control means being provided, responsive to a loss of pilot frequency on said path for rendering the muting circuit associated with said path operative, the control means for each path being interdependent whereby upon a loss of pilot frequency on all of said paths all of said control means are inhibited from rendering said muting circuits operative.

Commonly there are four paths carrying signals to be combined.

Preferably noise level sampling means are provided for each path and said control means are arranged, when inhibited from rendering said muting circuits operative due to a loss of pilot frequency on all of said paths to render their associated muting circuits operative upon detection of high noise levels.

Preferably again, means are provided for rendering said control means independent of one another, the arrangement being such that then each control menas independently renders operative its associated muting circuit only upon detection of high noise levels in the path with which it is associated.

Figure 1:
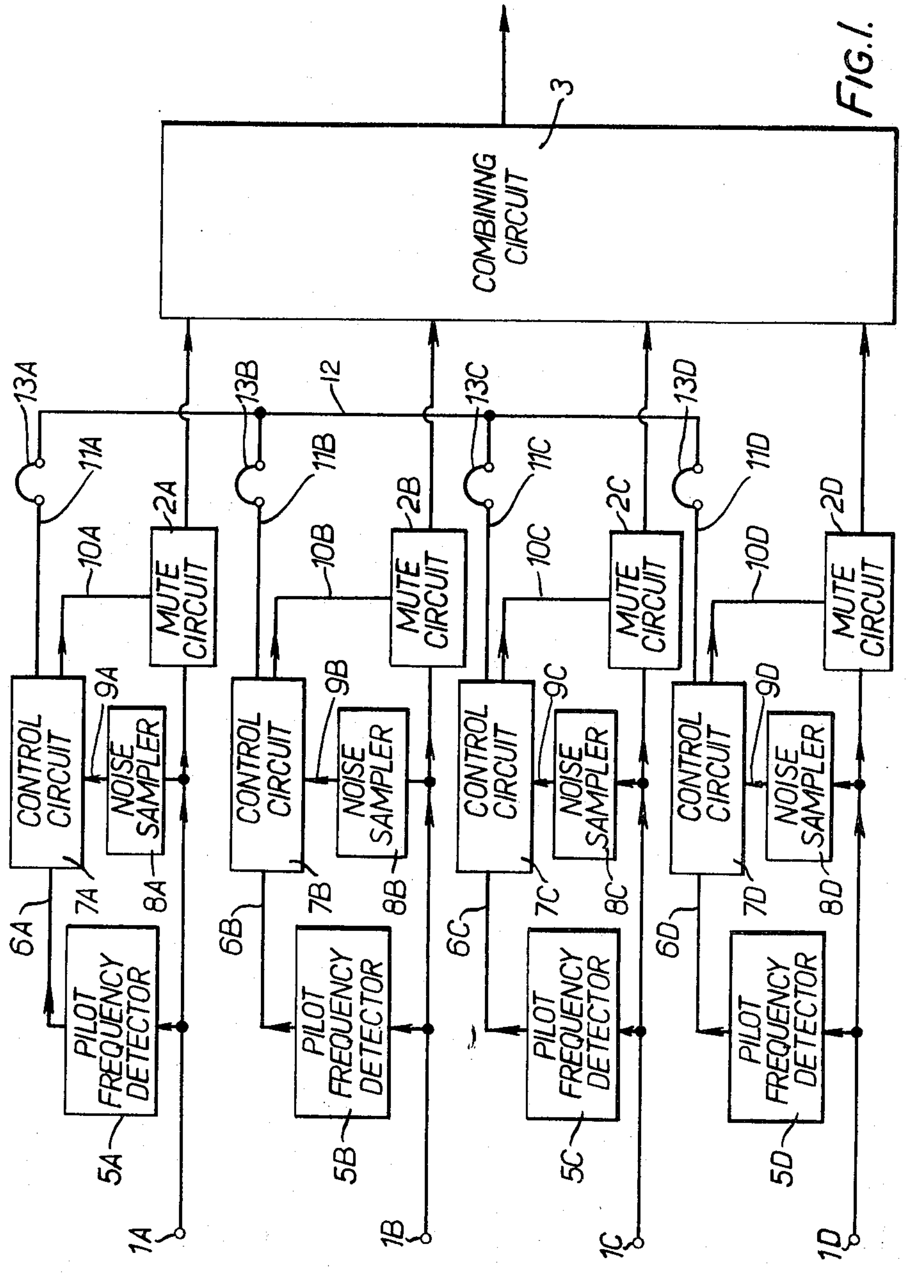
Figure 2:
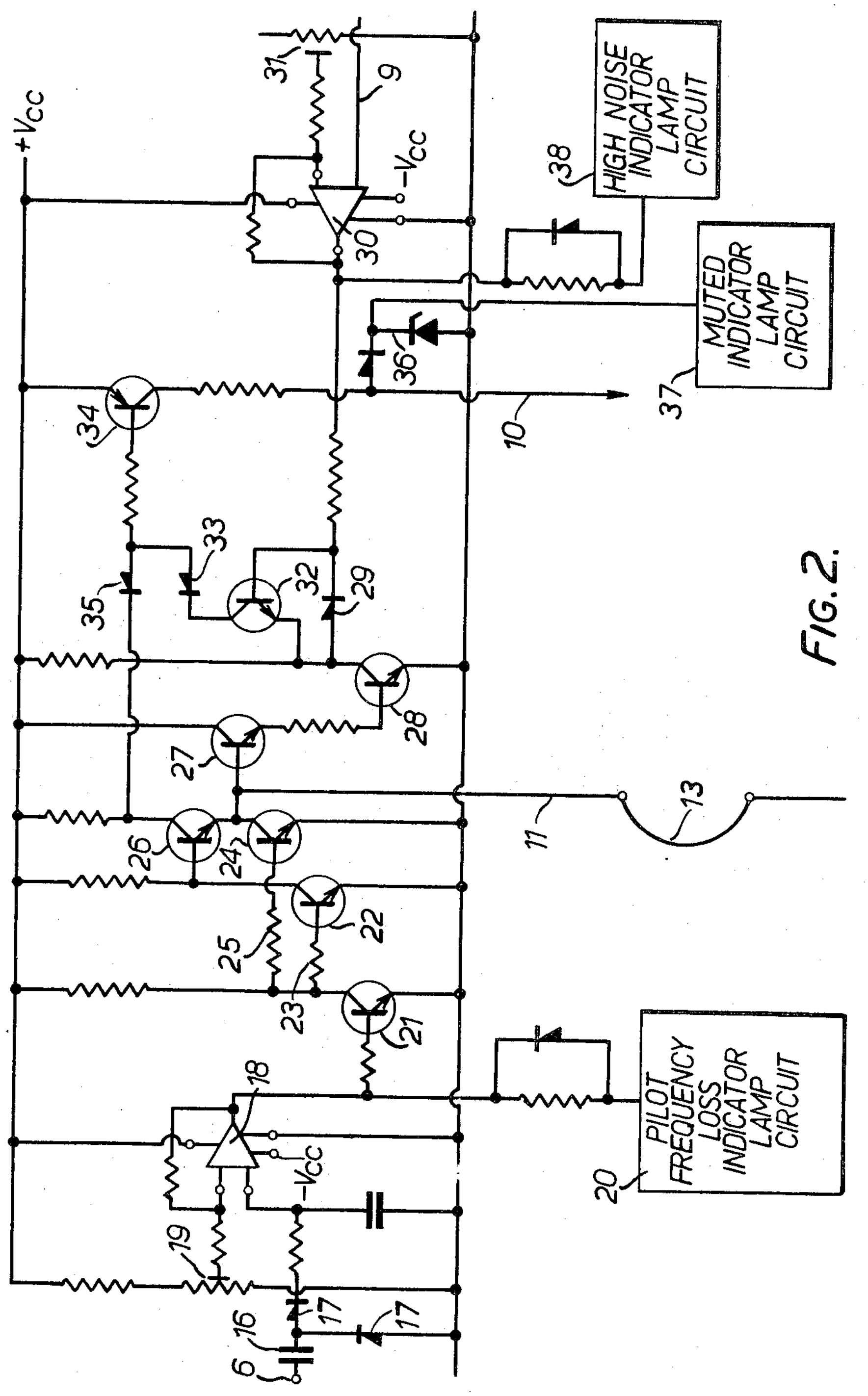

The invention is illustrated in and further described with reference to the accompanying drawings in which FIG. 1 is a block schematic diagram of a diversity combining arrangement in accordance with the present arrangement and FIG. 2 is a detailed circuit diagram of a control circuit used in FIG. 1.

Referring to FIG. 1, four input terminals 1A, 1B, 1C and 1D are provided to receive baseband input signals required to be combined. Terminal 1A is connected via a muting circuit 2A to one input terminal of a combiner 3, whilst input terminal 1B is connected through a muting circuit 2B to a second input terminal of combiner 3. Input terminal 1C is connected through a muting circuit 2C to a third input terminal of combiner 3, whilst input terminal 1D is connected through a muting circuit 2D to a fourth input terminal of combiner 3. Combiner 3 may be as well known per se. A pilot frequency detector 5A is connected to detect the presence or absence of a pilot frequency in the baseband signals applied to terminal 1A. The output terminal of pilot frequency detector 5A is connected via lead 6A to a control circuit 7A. A noise sampler 8A is connected to sample the level of noise appearing at input terminal 1A. The output terminal of noise sampler 8A is connected via lead 9A to control circuit 7A. Output lead 10A from control circuit 7A is connected to control muting circuit 2A, the presence or absence of a signal on lead 10A determining whether muting circuit 2A acts to mute signals passing from input terminal 1A to combiner 3 or merely passes such signals. Lead 11A from control circuit 7A is a muting reference lead.

For each of the input terminals 1B, 1C and 1D there is provided circuitry similar to that provided in respect of input terminal 1A. This circuitry is referenced using a reference number identical to that used in respect of the circuitry associated with input terminal 1A, but with an appropriate reference letter B, C or D.

Muting reference leads 11A, 11B, 11C and 11D from each of the control circuits 7A, 7B, 7C and 7D are joined together by a common lead 12 via interposed links 13A, 13B, 13C and 13D respectively, so that by the removal of a link any control circuit may be isolated so far as muting is concerned.

The control signals from 7A, 7B, 7C and 7D are such that if a pilot frequency is present in the signals at each of the input terminals 1A, 1B, 1C and 1D none of the muting circuits 2A, 2B, 2C and 2D are rendered operative. When any pilot frequency is lost from the signals appearing at any of the input terminals 1A to 1D, the control circuit 7A, 7B, 7C or 7D as appropriate causes the appropriate muting circuit 2A, 2B, 2C or 2D to operate. If, however, all four pilot frequencies are lost, assuming the links 13A to 13D are made, the control circuits 7A to 7D render inoperative muting circuits 2A to 2D; and each control circuit considers noise level at the input terminal 1A to 1D and causes the muting circuit associated with any path exhibiting a high noise level to be operated.

If the links 13A to 13D are removed each control circuit 7A to 7D is arranged to render its muting circuit 2A to 2D operative if the associated path is noisy. To explain control circuits 7A to 7D in greater detail, reference will now be made to FIG. 2 which shows the circuit detail of one of the control circuits.

Referring to FIG. 2, lead 6, which corresponds to lead 6A, 6B, 6C or 6D in FIG. 1, is connected to apply pilot frequency signals via a d.c. blocking capacitor 16 and rectifier arrangement 17 to one input terminal of a comparator 18, the other input terminal of which is connected to a voltage potentiometer 19. The output terminal of comparator 18 is connected to a "pilot-fail" indicator lamp driving circuit 20 so that when comparator 18 detects the absence of pilot frequency on lead 6 an indicator lamp is lit. The output terminal of comparator 18 is also connected to the base of common emitter NPN transistor 21, the collector electrode of which is connected to the base electrode of a further common emitter NPN transistor 22, via a resistor 23. The collector electrode of transistor 21 is also connected to the base electrode of a further common emitter NPN transistor 24 via resistor 25, which is of a value similar to that of resistor 23.

Transistor 24 is connected with its emitter/collector path in series with the emitter/path of a further NPN transistor 26. The base electrode of transistor 26 is connected to the collector electrode of transistor 22. A common point between the emitter electrode of transistor 26 and the collector electrode of transistor 24 is connected to the base of an NPN transistor 27 and also to lead 11, which lead corresponds to lead 11A, 11B, 11C or 11D in FIG. 1.

Transistor 27 has its emitter electrode connected to the base electrode of a common emitter NPN transistor 28 to the collector electrode of which is connected, via a rectifier 29, the output terminal of a further voltage comparator 30. Voltage comparator 30 has one input terminal connected to a voltage potentiometer 31, whilst to its other input terminal is connected lead 9 which corresponds to lead 9A, 9B, 9C or 9D in FIG. 1. The collector electrode of transistor 28 is also connected to the emitter electrode of an NPN transistor 32, the base electrode of which is connected to the output terminal of comparator 30, whilst the collector electrode of which is connected via a rectifier 33 to the base electrode of a PNP transistor 34. The base electrode of transistor 34 is also connected via a rectifier 35 to the collector electrode of transistor 26. The collector electrode of transistor 34 is connected to lead 10 which corresponds to lead 10A, 10B, 10C or 10D of FIG. 1. The connection from lead 10 is taken, via a rectifier arrangement 36 to a "muted" indicator lamp driving circuit 37. From the output terminal of voltage comparator 30 is taken a connection to a "high noise" indicator lamp driving circuit 38.

To explain the operation of the circuit of FIG. 2, assume normal operation with pilot frequency present at all of the input terminals 1A to 1D of FIG. 2. In this situation the state of the circuit of FIG. 2 will be as follows:

The value of the output of comparator 18 is low and thus transistor 21 is non-conductive.

Since transistor 21 is non-conductive, transistors 22 and 24 are conductive.

Since transistors 22 and 24 are conductive, transistor 27 is non-conductive.

Because transistor 27 is non-conductive, transistor 28 is non-conductive.

Because transistor 28 is non-conductive, transistor 32 is non-conductive.

Because transistor 32 is non-conductive, transistor 34 is non-conductive.

The value of the muted reference signal appearing on lead 11 is low.

Because transistor 34 is non-conductive no signal appears on lead 10 to operate muting circuit 2A, 2B, 2C or 2D of FIG. 1, as the case may be.

Suppose now a signal appears on lead 9 which indicates a high noise content, as detected by noise sampler 8A, 8B, 8C or 8D of FIG. 1, in this situation the state of the circuit of FIG. 2 changes to the extent that the value of the output of comparator 30 goes high which causes the indicated lamp associated with circuit 38 to illuminate. Since transistor 28 is still non-conductive, however, no further action occurs.

If, on the other hand, assuming normal operation with no high noise, one of the pilot frequencies is lost (assumed for the sake of explanation to be that in the signals on the input lead 6 shown in FIG. 2), the state of the circuit of FIG. 2 changes as follows:

The value of the output of comparator 18 goes high.

The high value of the output of comparator 18 causes the indicator lamp associated with circuit 20 to illuminate.

Again, because of the high value of the output of comparator 18, transistor 21 is rendered conductive.

Because transistor 21 is conductive, transistors 22 and 24 are rendered non-conductive.

Because transistors 22 and 24 are non-conductive, transistor 26 is conductive.

Because transistor 26 is conductive, in view of the low potential level on lead 11 transistor 34 is rendered conductive.

As transistor 34 is rendered conductive a signal is provided on lead 10 which causes the appropriate muting circuit 2A, 2B, 2C or 2D of FIG. 1 to operate to mute the path in which the pilot frequency is lost. Despite the fact that transistor 24 is non-conductive, however, the signal level on path 11 is still low since the other control circuits will still be operating in their normal state — it will be recalled that leads 11A, 11B, 11C and 11D of FIG. 1 are joined to main connection 12 via links 13A to 13D. Therefore, only the path exhibiting a loss of pilot frequency is muted.

Assuming a situation as described immediately above in which one pilot frequency has been lost, if now all four pilot frequencies are lost, all of the control circuits change their states as now described with reference to the one shown in FIG. 2 only:

The output of comparator 18 is high.

Because the output of comparator 18 is high transistor 21 is rendered conductive and the indicator bulb associated with circuit 20 is illuminated.

Because transistor 21 is conductive, transistors 22 and 24 are non-conductive.

Because transistors 22 and 24 are non-conductive transistor 26 is conductive.

Because transistor 24 is non-conductive, the potential of lead 11 goes high due to the cumulative effect of all of the control circuits which are all experiencing a loss of pilot frequency.

Because of the high potential on lead 11 transistor 27 conducts.

Because transistor 27 is conducting, transistor 28 is conducting which in turn renders transistor 32 non-conductive.

Because transistor 32 is not conducting transistor 34 is rendered non-conductive. As transistor 34 is rendered non-conductive so the muting signal on lead 10 disappears, thus rendering all of the control circuits incapable of operating their associated muting circuits by pilot failure.

Assuming a situation as described immediately above, if anyone of the noise samplers 8A to 8D detects a high noise content, the control circuit 7A, 7B, 7C or 7D associated with that muting circuit changes its state from one in which it is incapable of operating its associated muting circuit as follows:

The value of the output of comparator 30 goes high.

The indicator lamp associated with circuit 38 is illuminated.

Because the value of the output of comparator 30 is high transistor 32 is rendered conducting.

Because transistor 32 is conducting transistor 34 is rendered conductive causing the muting signal to be applied to lead 10.

Thus where all of the control circuits are in a condition such as to be incapable of rendering operative their associated muting circuit due to the loss of their pilot frequencies, each individual control circuit will apply a muting signal to its associated muting circuit if, in addition, a high noise content is detected on the path with which it is associated.

If the muting reference links 13A to 13D are removed and the leads 11 are left floating, muting will be accomplished in response to individual high noise conditions only.

We claim

1. A diversity combining arrangement for combining signals appearing on at least two paths comprising for each path, a muting circuit for muting the signals on said path, detecting means for detecting a pilot signal on said path, control means connected to said detecting means for operating the muting circuit upon loss of the pilot signal, all of said control means being interconnected such that the loss of said pilot signal on more than one of said paths inhibits all the control means from rendering said muting circuits operative.

2. A diversity combining arrangement for combining signals appearing on at least two paths comprising for each path, a muting circuit for muting the signals on said path, detecting means for detecting a pilot signal on said path, control means connected to said detecting means for operating the muting circuit upon loss of the pilot signal, all of said control means being interconnected such that the loss of said pilot signal on all of said paths inhibits all the control means from rendering said muting circuits operative.

3. An arrangement as claimed in claim 1 and wherein there are four paths carrying signals to be combined.

4. An arrangement as claimed in claim 1 and wherein noise level sampling means are provided for each path and said control means are arranged, when inhibited from rendering said muting circuits operative due to a loss of pilot frequency on all of said paths to render their associated muting circuits operative upon detection of high noise levels.

5. An arrangement as claimed in claim 1 and wherein means are provided for rendering said control means independent of one another, the arrangement being such that then each control means independently renders operative its associated muting circuit only upon detection of high noise levels in the path with which it is associated.

* * * * *